(12) United States Patent
Farreyrol et al.

(10) Patent No.: US 11,679,649 B2
(45) Date of Patent: Jun. 20, 2023

(54) MULTIFUNCTIONAL SWITCHABLE FILM AND CONSTRUCTIONS INCLUDING SUCH A FILM

(71) Applicant: ACR II GLASS AMERICA INC., Nashville, TN (US)

(72) Inventors: Olivier Farreyrol, Wasserbillig (LU); Yu Matsuda, Nashville, TN (US); Markus Walter Pohlen, Mückeln (DE)

(73) Assignee: ACR II GLASS AMERICA INC., Nashville, TN (US)

( * ) Notice: Subject to any disclaimer, the term of this patent is extended or adjusted under 35 U.S.C. 154(b) by 0 days.

(21) Appl. No.: 17/282,535

(22) PCT Filed: Oct. 3, 2019

(86) PCT No.: PCT/US2019/054380
§ 371 (c)(1),
(2) Date: Apr. 2, 2021

(87) PCT Pub. No.: WO2020/072709
PCT Pub. Date: Apr. 9, 2020

(65) Prior Publication Data
US 2021/0339609 A1 Nov. 4, 2021

Related U.S. Application Data

(60) Provisional application No. 62/811,048, filed on Feb. 27, 2019, provisional application No. 62/741,078, filed on Oct. 4, 2018.

(51) Int. Cl.
*B32B 17/06* (2006.01)
*B32B 15/04* (2006.01)
(Continued)

(52) U.S. Cl.
CPC ............... *B60J 1/001* (2013.01); *B32B 7/023* (2019.01); *B32B 17/10036* (2013.01);
(Continued)

(58) Field of Classification Search
CPC .................... B32B 17/10036; B32B 2307/42
(Continued)

(56) References Cited

U.S. PATENT DOCUMENTS 5,712,695 A * 1/1998 Tanaka .................. G02F 1/1347
349/139
6,154,263 A 11/2000 Bailey et al.
(Continued)

FOREIGN PATENT DOCUMENTS

CN 105026146 A 11/2015
DE 10 2007 015415 A1 10/2008
(Continued)

OTHER PUBLICATIONS

DE102007015415 translation, 2008.*
(Continued)

*Primary Examiner* — Lauren R Colgan
(74) *Attorney, Agent, or Firm* — K&L Gates LLP

(57) ABSTRACT

The present disclosure relates to a laminated glazing comprising a first glass substrate and a second glass substrate laminated together having first and second polymer intermediate films therebetween, and a layered film laminated between the polymer intermediate films, wherein the layered film comprises at least three carrier layers positioned parallel to one another with a second carrier layer positioned between first and third carrier layers, wherein a first surface of the first carrier layer is coated with a first transparent conductive coating and a first surface of the second carrier layer is coated with a second transparent conductive coating, wherein the first surface of the first carrier layer faces the
(Continued)

first surface of the second carrier layer, and wherein a second surface of the second carrier layer is coated with a third transparent conductive coating and a first surface of the third carrier layer is coated with a fourth transparent conductive coating, wherein the second surface of the second carrier layer faces the first surface of the third carrier layer; a first switchable layer positioned between the first and second carrier layers; and a second switchable layer positioned between the second and third carrier layers.

15 Claims, 3 Drawing Sheets

(51) Int. Cl.
  *B60J 1/00* (2006.01)
  *B32B 7/023* (2019.01)
  *B32B 17/10* (2006.01)
  *B60J 3/04* (2006.01)
(52) U.S. Cl.
  CPC .. *B32B 17/10504* (2013.01); *B32B 17/10513* (2013.01); *B32B 17/10761* (2013.01); *B60J 3/04* (2013.01); *B32B 17/10201* (2013.01); *B32B 17/10532* (2013.01); *B32B 2255/10* (2013.01); *B32B 2255/20* (2013.01); *B32B 2307/42* (2013.01); *B32B 2605/006* (2013.01)
(58) Field of Classification Search
  USPC .......................................... 428/426, 428, 432
  See application file for complete search history.

(56) References Cited

U.S. PATENT DOCUMENTS

| | | | |
|---|---|---|---|
| 6,271,901 B1 | 8/2001 | Ide et al. | |
| 7,255,926 B2 | 8/2007 | Bayer et al. | |
| 2001/0028028 A1 | 10/2001 | Iwasaki et al. | |
| 2007/0076288 A1 | 4/2007 | Yoshimura et al. | |
| 2007/0159678 A1 | 7/2007 | Verhaegh et al. | |
| 2007/0216851 A1 | 9/2007 | Matsumoto et al. | |
| 2009/0323160 A1 | 12/2009 | Egerton et al. | |
| 2011/0181820 A1 | 7/2011 | Watanabe et al. | |
| 2013/0286458 A1 | 10/2013 | Lamine et al. | |
| 2014/0176836 A1* | 6/2014 | Brecht | B32B 17/10192 349/16 |
| 2014/0253848 A1 | 9/2014 | Wammes et al. | |
| 2014/0293194 A1* | 10/2014 | Kang | G02F 1/133528 349/96 |
| 2015/0331296 A1 | 11/2015 | Mennig et al. | |
| 2016/0138328 A1* | 5/2016 | Behmke | B32B 38/0004 359/275 |
| 2018/0311937 A1 | 11/2018 | Hakemi et al. | |
| 2019/0033677 A1 | 1/2019 | Letocart et al. | |
| 2020/0201113 A1 | 6/2020 | Baierl et al. | |

FOREIGN PATENT DOCUMENTS

| | | |
|---|---|---|
| DE | 10 2016 216929 A1 | 3/2018 |
| DE | 102016216929 A1 | 3/2018 |
| DE | 20 2019 1 00 577 U1 | 3/2019 |
| EP | 3317718 A2 | 5/2018 |
| EP | 3317719 A2 | 5/2018 |
| WO | 2009061329 A1 | 5/2009 |
| WO | 2018/233989 A1 | 12/2018 |

OTHER PUBLICATIONS

DE102016216929 translation, 2018.*
Extended European Search Report for European Application No. 19868307.0, dated Oct. 26, 2021, by the European Patent Office, 8 pages.
International Search Report and the Written Opinion for International application No. PCT/US2019/054380, filed Oct. 3, 2019, dated Jan. 6, 2020 by International Search Authority, 15 pages.
Office Action for related Chinese Application No. 201980065228.X; action dated Aug. 18, 2022; (13 pages).
Extended European Search Report for related European Application No. 19868775.8; action dated Jul. 13, 2022; (12 pages).

* cited by examiner

MULTIFUNCTIONAL SWITCHABLE FILM AND CONSTRUCTIONS INCLUDING SUCH A FILM

CROSS REFERENCE TO RELATED APPLICATIONS

This application is a national stage of PCT International Application No. PCT/US2019/054380, filed on Oct. 3, 2019, which claims priority to U.S. Provisional Patent Application No. 62/741,078 filed on Oct. 4, 2018, entitled "MULTIFUNCTIONAL SWITCHABLE FILM AND CONSTRUCTIONS INCLUDING SUCH A FILM," and U.S. Provisional Patent Application No. 62/811,048 filed on Feb. 27, 2019, entitled "MULTIFUNCTIONAL SWITCHABLE FILM AND CONSTRUCTIONS INCLUDING SUCH A FILM," the contents of which are incorporated by reference herein in their entirety.

TECHNICAL FIELDS

The present disclosure generally relates to a switchable film having at least two functional layers.

BACKGROUND

Switchable films in glass constructions are provided for various purposes, including, without limitation, architectural and vehicle windows. Switchable films include, but are not limited to, those based on liquid crystal constructions. A switchable film may be selectively changed from an opaque or dark state to a transparent state by the application of an electric field to the film. The electrical connection may be placed within the glass construction to control the switchable material. When an electric field is activated, the switchable material transfers from an opaque state to a transparent state or vice versa.

Switchable materials may be provided in various forms, including polymer dispersed liquid crystal (PDLC), polymer network liquid crystal (PNLC), and suspended particle device (SPD) constructions. Further switchable films may include electrochromic constructions. Particularly, PDLC films are formed by liquid crystal(s) dispersed throughout a liquid polymer matrix. As the polymer matrix solidifies, the liquid crystals form droplets. The random arrangement of liquid crystal droplets results in the opaque, milky appearance of PDLC in an OFF state. When an electrical current is applied to the PDLC, the liquid crystals align in a nematic orientation in the direction of the electric field. The parallel orientation allows for light to pass through, and in the ON state, PDLC is transparent. PNLC may also provide a film that may selectively switch between opaque and transparent states. PNLC films have a much higher ratio of liquid crystal to polymer and require a lower driving voltage. PDLC and PNLC films may also be configured to have a reverse alignment. In a default OFF state, the PDLC or PNLC is transparent, and in an ON state with an electric voltage applied, the PDLC or PNLC is opaque.

A PDLC or PNLC film may be used selectively to provide privacy or allow light transmission therethrough for various uses. The PDLC and PNLC films may be used as a display surface. The display surface may be a white, opaque film for use with a source to project an image on the film. A PDLC or PNLC display may be affected, however, by light behind the film. In architectural and vehicle applications, sunlight or other light sources may shine behind the PDLC or PNLC film and hinder the ability to see a projection on the display.

Thus, there is a need in the prior art for a PDLC or PNLC film with improved use in various lighting conditions.

SUMMARY OF THE DISCLOSED INVENTION

Certain embodiments disclosed herein include a laminated glazing comprising a first glass substrate and a second glass substrate laminated together having first and second polymer intermediate films therebetween and a layered film laminated between the first and second polymer intermediate films, wherein the layered film comprises at least three carrier films positioned in parallel to one another with a second carrier film positioned between first and third carrier films, wherein a first surface of the first carrier film is coated with a first transparent conductive coating and a first surface of the second carrier film is coated with a second transparent conductive coating, wherein the first surface of the first carrier film faces the first surface of the second carrier film, and wherein a second surface of the second carrier film is coated with a third transparent conductive coating and a first surface of the third carrier film is coated with a fourth transparent conductive coating, wherein the second surface of the second carrier film faces the first surface of the third carrier film; a first switchable layer positioned between the first and second carrier films; and a second switchable layer positioned between the second and third carrier films.

In some embodiments, the laminated glazing may be for an architectural or automotive glazing. The laminated glazing may further include an anti-reflective layer or a transparent dielectric layer. A transparent dielectric layer may particularly be positioned between at least one of the carrier films and a transparent conductive coating.

Further, the laminated glazing may include a suspended particle device switchable layer. Some embodiments may include a liquid crystal switchable layer, which may include a polymer dispersed liquid crystal layer or a polymer network liquid crystal layer. Certain embodiments may include an electrochromic switchable layer.

In certain embodiments, the switchable layers may be different. Particular embodiments may include a suspended particle device and a liquid crystal layer, which may include a polymer dispersed liquid crystal layer or a polymer network liquid crystal layer in certain embodiments.

The switchable layers in the laminated glazing may include first and second electrical connections which may be controlled separately. The electrical connections may further be variable to provide ON, OFF, and partially ON states.

In further embodiments, either or both switchable layers may be segmented, wherein transparent conductive coatings may include deletions forming the segmentation. The segments may be provided on one or both switchable layers. Where the switchable layers are both segmented, the segmentation may be the same or different. Further, the switchable layer segments may be electrically isolated from each other and be separately connected to a power source.

In particular embodiments, the intermediate films may comprise polyvinyl butyral.

Certain embodiments may provide a fourth carrier film facing the third carrier film, a second surface of the third carrier film is coated with a fifth transparent conductive coating and a first surface of the fourth carrier film is coated with a sixth transparent conductive coating, wherein the second surface of the third carrier film faces the first surface of the fourth carrier film and a third switchable layer positioned between the third and fourth carrier films.

The laminated glazing may further include an infrared reflective layer. In some embodiments, the infrared reflective layer may be a transparent conductive coating, including the first transparent conductive coating.

In some further embodiments, two of the carrier films may be polarizing films wherein one of the polarizing films has a polarizing angle 90° to a polarizing angle of the other polarizing film. A liquid crystal layer may be provided as the switchable layer between the polarizing films. The other switchable layer may include a polymer dispersed liquid crystal or polymer network liquid crystal layer.

The present application further discloses a layered material comprising at least three carrier films positioned parallel to one another with a second carrier film positioned between first and third carrier films, wherein a first surface of the first carrier film is coated with a first transparent conductive coating and a first surface of the second carrier film is coated with a second transparent conductive coating, wherein the first surface of the first carrier film faces the first surface of the second carrier film, and wherein a second surface of the second carrier film is coated with a third transparent conductive coating and a first surface of the third carrier film is coated with a fourth transparent conductive coating, wherein the second surface of the second carrier film faces the first surface of the third carrier film, a first switchable layer positioned between the first and second carrier films and a second switchable layer positioned between the second and third carrier films.

Further, the layered material may include a suspended particle device switchable layer. Some embodiments may include a liquid crystal switchable layer, which may include a polymer dispersed liquid crystal layer or a polymer network liquid crystal layer. Certain embodiments may include an electrochromic switchable layer. Particular embodiments may include a suspended particle device and a liquid crystal layer, which may include a polymer dispersed liquid crystal layer or a polymer network liquid crystal layer in certain embodiments.

The layered material may include first and second transparent conductive coatings which are the same. Particularly, the coatings may be indium tin oxide. Further embodiments may include more than one type of transparent conductive coating. In certain embodiments, a transparent conductive coating may include an infrared reflective layer.

Further embodiments of the layered material may include a transparent dielectric layer. In some embodiments, the transparent dielectric layer may be positioned between a carrier film and a conductive coating.

In further embodiments, either or both switchable layers may be segmented, wherein transparent conductive coatings may include deletions forming the segmentation. The segments may be provided on one or both switchable layers. Where the switchable layers are both segmented, the segmentation may be the same or different. Further, the switchable layer segments may be electrically isolated from each other and be separately connected to a power source.

Further, the layered material may be laminated between intermediate films, including polyvinyl butyral which may further be laminated between glass substrates.

Certain embodiments may provide a fourth carrier film facing the third carrier film, a second surface of the third carrier film is coated with a fifth transparent conductive coating and a first surface of the fourth carrier film is coated with a sixth transparent conductive coating, wherein the second surface of the third carrier film faces the first surface of the fourth carrier film and a third switchable layer positioned between the third and fourth carrier films.

In some further embodiments, two of the carrier films may be polarizing films wherein one of the polarizing films has a polarizing angle 90° to a polarizing angle of the other polarizing film. A liquid crystal layer may be provided as the switchable layer between the polarizing films. The other switchable layer may include a polymer dispersed liquid crystal or polymer network liquid crystal layer.

BRIEF DESCRIPTION OF THE DRAWINGS

The accompanying drawings, which are incorporated and constitute a part of this specification, illustrate one or more example aspects of the present disclosure and, together with the detailed description, serve to explain their principles and implementations.

DETAILED DESCRIPTION

Figure 1:
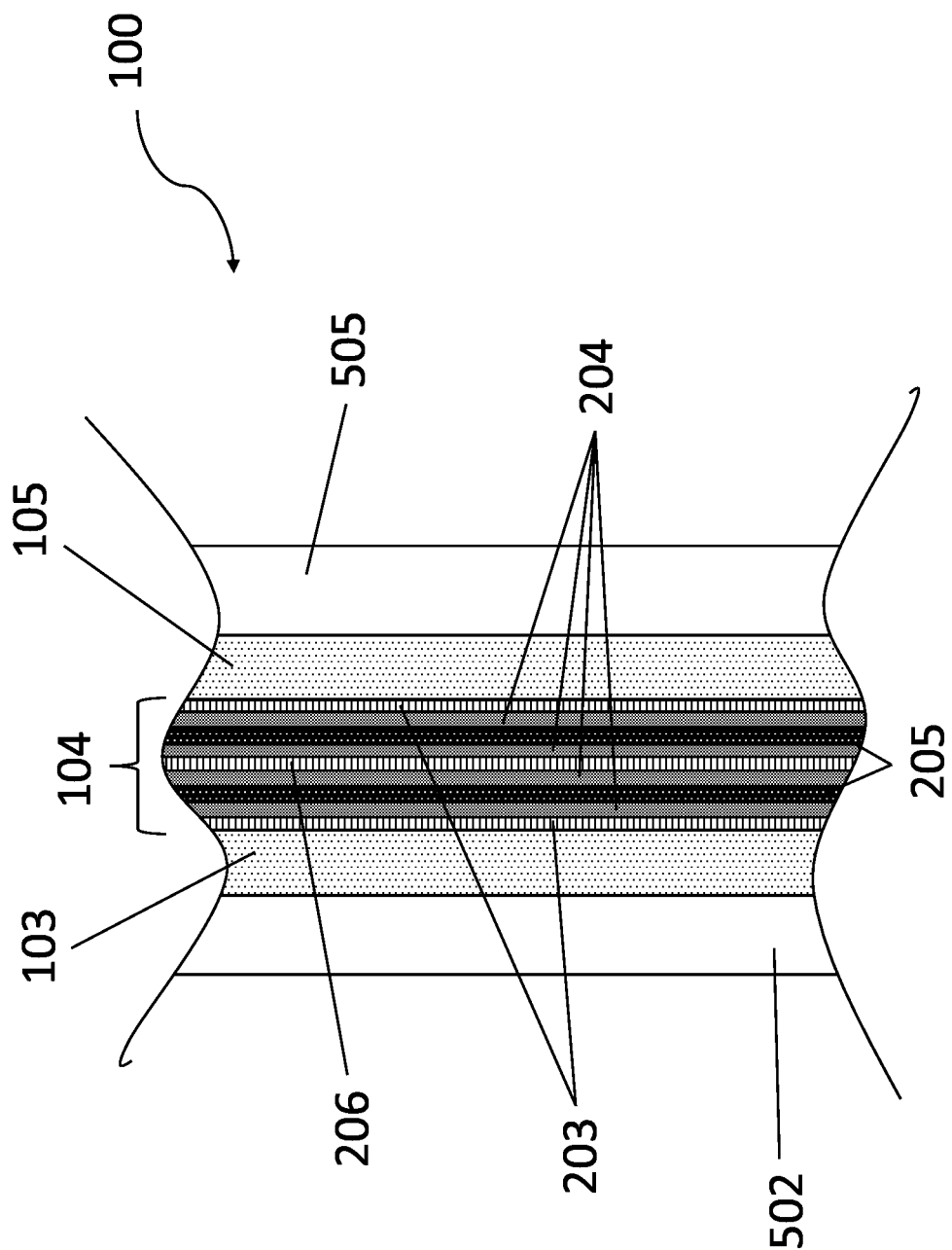
FIG. 1 illustrates a cross sectional view of a glass laminate including a laminated stack having two switchable layers, according to an exemplary embodiment of the present disclosure.

Disclosed herein is a multifunctional switchable film having more than one functional layer and glass products having such a film. In the following description, for purposes of explanation, specific details are set forth in order to promote a thorough understanding of one or more aspects of the disclosure. It may be evident in some or all instances, however, that any aspect described below can be practiced without adopting the specific design details described below.

For purposes of this disclosure, a "side" of a PDLC, PNLC, SPD, electrochromic, switchable, or carrier film is a surface or portion of the film upon which a substrate and/or a film layer may be stacked. Films disclosed herein may switch from an "opaque" state to a "transparent" state. In a transparent state, the films have a higher visible light transmittance than in an opaque state. Some light may transmit through the opaque films, and the opaque films may include darkened films which may not be milky in color. In some films, a transparent ON state may have visible light transmittance less than 100%. Further, the films may have at least one partially opaque state where the film has a visible light transparency between the visible light transparency in an opaque state and the visible light transparency in a transparent state. Visible light transparency may particularly be determined by ISO 3538:1997, "Road vehicles—Safety glazing materials—Test methods for optical properties".

Switchable layers or films may include any suitable material, including polymer dispersed liquid crystals (PDLC), polymer network liquid crystals (PNLC), suspended particle devices (SPD), or electrochromic films. Particularly, SPD materials may include particles suspended in a fluid. A SPD film may have a darkened color in an OFF state due to the particles suspended within the film. In an ON state, under an applied voltage, the SPD film may be transparent or more transparent than in an OFF state. When an electric current is applied to the SPD film, the particles align, allowing light to pass through the film. The amount of light transmitted through the SPD film may depend on the electric voltage applied thereto. Therefore, a partially ON state may be achieved by applying a voltage below that required to provide a SPD film in an ON state.

A liquid crystal switchable film may be opaque or transparent in an OFF state. When an electric voltage is applied to the liquid crystal switchable film, the film may switch from opaque to transparent or from transparent to opaque in an ON state. The amount of change in transparency and opaqueness may be controlled by the amount of the electric voltage applied to the film and a partially ON state may be formed. Particularly, a partially ON state may be achieved by the application of an electric voltage lower than a voltage which will provide a fully ON state of the film. As with PDLC and PNLC, SPD may be selectively in an ON, partially ON, or OFF state depending on the voltage applied to the film.

Typically, PDLC or PNLC films may provide a milky, opaque surface which may be used as a display screen; however, the film may not completely block light. Thus, some light may transmit through a PDLC or PNLC film in an opaque state. Where a PDLC or PNLC film is used as a screen, light transmitting through the film may be undesirable. The light may interfere with the ability to see a display on the film surface and a user's comfort in using the film display. Limiting the light that may transmit through the PDLC or PNLC may be desirable to limit the interference of a light source, such as the sun. A switchable layer, such as SPD, may provide a dark surface behind the PDLC or PNLC display, limiting the sunlight's effect on the liquid crystal display. The darker background may block sunlight from the PDLC or PNLC display, providing an improved viewing experience on the liquid crystal display. The reduced light transmitting through a display surface may improve the contrast of the image displayed on the film.

Further, PDLC or PNLC displays are not directional. Thus, an image projected onto a PDLC or PNLC display may be visible from the opposite side of the film. A darkened switchable layer, including SPD, may, in some lighting conditions, reduce the visibility of an image on the opposite side of the PDLC or PNLC display.

A glass product having switchable capabilities may be formed by providing a switchable film between two glass substrates. Generally, switchable layers, including PDLC, PNLC, and SPD layers, are each constructed between two carrier films. The carrier films may include, but are not limited to, polymer films, such as polyethylene terephthalate (PET) and polycarbonate films, or coated glass sheets. A transparent conductive material, including, but not limited to, transparent conductive oxides (TCO) such as indium tin oxide (ITO), may be coated on the carrier films such that the functional switchable layer faces the transparent conductive material coatings. This film construct may be sandwiched between two adhesive polymer interlayers, which may include, but are not limited to, polyvinyl butyral (PVB) or ethylene vinyl acetate (EVA). Particularly, a PVB-switchable film construct-PVB layered material may be laminated between two glass substrates. The layered films may further be used in any other suitable application, including lamination between non-glass materials.

It may be desirable to include more than one switchable functional film, such as a liquid crystal switchable film, e.g., PDLC or PNLC, and a SPD film, in a single glass laminate to provide a switchable darkened background for a switchable display screen. As mentioned above, typically each switchable layer may be separately constructed between PET sheets such that, where more than one switchable layer is to be provided in a construction, the construction may include two carrier films (e.g., PET films) for each switchable layer. The carrier films may not be laminated directly together within a glass laminate without an adhesive therebetween. Thus, an adhesive polymer layer, such as PVB, must be included between the carrier films of the switchable films. As a result, the multiple polymer and adhesive sheets may result in an increase in the thickness of the laminate, undesirable haze or light reflection, and cost of the laminated product. According to aspects of the present disclosure, adhesive and carrier film layers may be eliminated from a final glass product design having a multifunctional switchable combined film, having more than one functional layer. As such, fewer adhesive and carrier film layers may provide a lighter weight construction, thereby reducing the potential weight of a finished glass product. A combined film construction may further require fewer steps in aligning intermediate layers between glass substrates during preparation and lamination of the glass product. For at least these reasons, a laminate film having more than one functional switchable layer in a single film sheet may be preferable to the additional thickness required for separate films. One such film may include a PDLC functional layer and a SPD functional layer in a single film construction.

In a film having more than one functional layer, each layer may be separately connected to one or more power sources. Therefore, a user may independently control the ON/OFF state of each functional layer. For example, a construction having SPD and PDLC or PNLC layers may allow a user to select both layers in an ON state, both layers in an OFF state, or one layer in an ON state and the other layer in an OFF state. Either or both functional layers may further be in a partially ON state. A glass laminate may appear as a typical glass where both functional layers are in a transparent state. Alternatively, the user may turn a functional layer, or both functional layers opaque to increase privacy, limit light transmission, and/or provide a display screen. Electrical connections to the switchable layers may have variable voltage connections such that an ON or partially ON state may be achieved. The electrical connections may include busbars and connectors applied to each conductive coating surrounding a switchable layer where the connectors may be connected to a power source. The power source for each switchable layer may be the same or different and each power source may be configured to provide a variable voltage to the switchable films where a user may determine the applied voltage corresponding to a desired switchable functionality.

Figure 2:
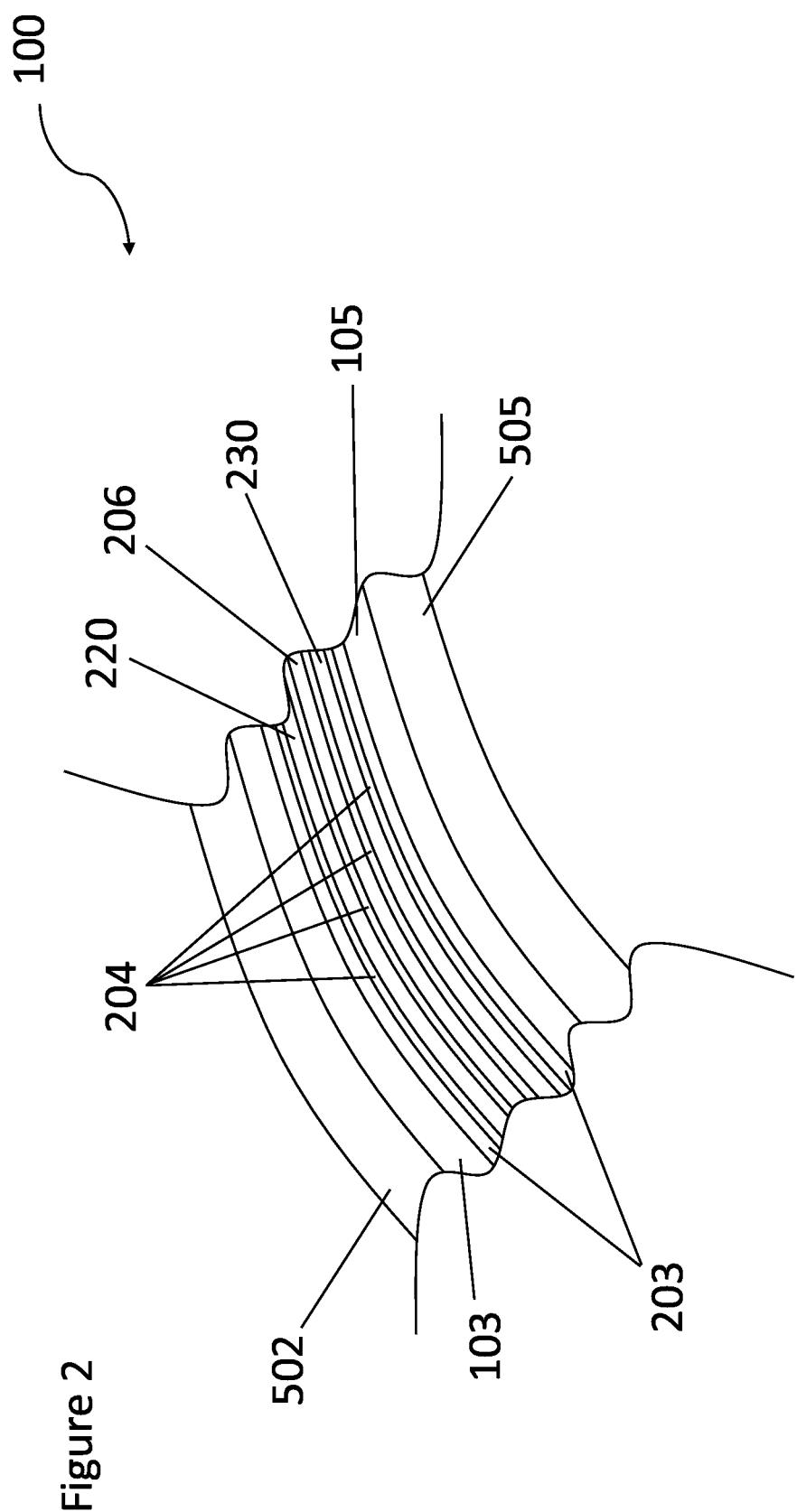
FIG. 2 illustrates a cross sectional view of a glass laminated including a SPD-PDLC film, according to an exemplary embodiment of the present disclosure.

FIG. 2 illustrates a bent glass laminate 100 having two functional layers, SPD 220 and PDLC 230, within a single intermediate film, according to aspects of the present disclosure. As shown in FIG. 1, the film 104 may comprise at least three carrier films 203, 206. In certain embodiments, outer carrier films 203 may each be coated with a conductive material 204 on an interior surface which faces a switchable functional layer 205, which may include SPD or PDLC in some embodiments. An inner carrier film 206 may be placed between the switchable layers 205 and may be coated with a conductive material 204 on both sides of the carrier film 206. Thus, each of the switchable layers 205 may be surrounded by conductive material 204 coated on an adjacent carrier film 203, 206. A SPD-PDLC film, or otherwise multi-switchable film 104 may be further sandwiched between intermediate adhesive polymer films 103, 105, which may include PVB. Glass substrates 502, 505 may be positioned outside of the adhesive films 103, 105 to form the glass laminate 100. Where the switchable layers 205 include SPD and PDLC, the SPD layer 220 may be preferably located between the PDLC 230 and an exterior surface of the glass laminate 100. For instance, in a vehicular window, the PDLC layer 230 may be placed closer to the vehicle interior than the SPD layer 220. Vehicle windows may include any suitable window, including side windows, sunroofs, windshields, or back windows. Films and laminated glass products disclosed herein may further be used in architectural glazings.

The transparent conductive material 204 may be any suitable material to coat a carrier film 203, 206 to form a transparent, conductive layer. The transparent conductive material 204 may include, without limitation, organic conductive polymers, transparent conductive oxides and transparent conductive non-oxides. Organic conductive polymers may include, without limitation, polythiophenes (such as PEDOT), polypyrroles, and polyanilines. Transparent conductive oxides may include, without limitation, indium tin oxide (ITO), fluorine tin oxide (FTO), aluminum zinc oxide (AZO) and indium gallium zinc oxide (IGZO). Transparent conductive non-oxides may include, without limitation, graphene, carbon nanotubes and silver nanowire (AgNW).

The transparent conductive material 204 adjacent to a SPD layer 220 may be the same or different from the transparent conductive material 204 adjacent to a PDLC layer 230. The functional switchable layers 205 may be sandwiched by the same or different conductive layers 204 in a single multifunctional film 104.

In some embodiments, one or more of the switchable layers may be segmented. A segmented switchable layer may be positioned between transparent conductive layers which have deletions defining segments. The segments may be electrically isolated from each other such that the segments may be electrically controlled independent of each other. Each segment in a switchable layer may be separately connected to a power source. Where more than one switchable layer in a film is segmented, the segmentation may have the same or different patterns. Where a switchable layer is segmented, the transparent conductive layers surrounding the switchable layer may each be etched with the desired segmentation pattern.

In further embodiments, transparent dielectric layer(s) may be coated between the transparent conductive layer 204 and the carrier films 203, 206. Transparent dielectric layer(s) may be a reflective index matching (IM) or passivation layer. The IM layer may include an inorganic or organic low reflective index layer, a high reflective index layer, or a combination thereof. Transparent dielectric layers may include, without limitation, any one of an oxide, nitride or oxynitride of Si, Ti, Al or Zr, or combinations of thereof.

Further, an anti-reflective layer may be included in a construction having the disclosed layered switchable film 104. An anti-reflective layer may reduce reflectivity of any suitable layer in a construction. Particularly, an anti-reflective layer may preferably limit reflection from the transparent conductive material 204. In some embodiments, materials for the reflective IM layer, passivation layer or anti-reflective layer may be the same. Further, the anti-reflective layer may be provided on a substrate in front of the film 104 used as a screen to prevent glare from the substrate, such as glass, in front of the screen surface. The anti-reflective layer may, in particular embodiments, be included on at least one carrier film 203, 206 and/or glass substrate 502, 505. In some embodiments, the anti-reflective layer may be between at least one carrier film 203, 206 and a transparent conductive coating 204 such that reflectivity of the transparent conductive coating 204 is reduced. An anti-reflective film or coating may be applied at some or all of the transparent conductive coatings 204.

In some embodiments herein, the laminated glass construction may include an infrared reflective (IRR) layer. The IRR layer may include a coating which may be provided on any suitable surface in the glazing, including a film or a glass sheet. In certain embodiments, the IRR layer may be provided in the switchable film. Particularly, the IRR layer may also be a conductive material such that a transparent conductive layer in the switchable film may have IRR properties. Preferably an IRR layer is between the switchable layers of a laminated film and an exterior facing glass sheet. The IRR layer may reflect infrared light prior to reaching switchable material layers in a switchable film such that the switchable material may have limited exposure to infrared light. IRR coatings may include more than one layer and may include any suitable functional material. In some embodiments, the IRR coating may include at least one functional layer which is metallic, such as silver, gold, or copper, or non-metallic. Preferably, the IRR coating includes at least one functional layer which is silver.

According to aspects of the present disclosure, bus bars may be provided on the transparent conductive materials 204 of the glass laminate 100 to provide electrical power to control the ON and OFF states of the switchable layers 205, which may include SPD and liquid crystal switchable layers. In one embodiment, referring to FIG. 1, the bus bars may be provided on each transparent conductive layer 204 on each outer carrier film 203 and inner carrier film 206. Separate power sources may be provided for the first switchable layer 205 and the second switchable layer 205, which may include a SPD layer 220 and a liquid crystal switchable layer 230, and a user may choose to control one or both switchable layers 205 in an ON, partially ON, or OFF state. The power source may be the same or different for each switchable layer 205. Varying the amount of the power applied to the SPD 220 and liquid crystal 230 switchable layers may vary the light transmitted through the layers to provide a partially ON state. The amount of power provided to each layer to provide an ON state may be the same or different for each functional layer.

Any suitable switchable material may be used in the constructions disclosed herein. For example, the switchable materials may include any of polymer dispersed liquid crystals, polymer network liquid crystals, suspended particle devices or electrochromic films in any combination of one or more than one type of switchable material. The layered materials disclosed herein may include one or more than one type of switchable material in a single stack of materials. For example, embodiments of the layered material may include an SPD and a PDLC layer or a PDLC layer and an electrochromic layer. Further embodiments may include more than two switchable materials. Any number of carrier films, transparent electrically conductive coatings, and switchable layers may be stacked in a layered film.

In some embodiments, one or more carrier films may be polarizing layers. Polarizing layers may include a polarizer compound and a glass sheet or film, which may include a polymer film. Particularly, an outer carrier film 203 and the inner carrier film 206 of a multifunctional switchable film may be polarizing layers wherein one of the polarizing layers has a 90° polarization angle to the other polarization layer in the construction. A liquid crystal layer may be positioned between the polarizing layers as a switchable layer where transparent conductive coatings are provided on the polarizing layers, facing the liquid crystal layer. In an OFF state, the polarizing layers and liquid crystal layer therebetween may provide a black or darkened surface which may be suitable as a background for a display surface as light may not pass through each polarizing layer where the layer polarizing angles are normal to one another. The black or darkened state may also provide privacy where desired. In an ON state, the liquid crystals may change the path of light therethrough such that the light may transmit through both polarizing layers, even though the layers are at a 90° to each other. The light may pass through a first polarizing layer and change polarization in the liquid crystal layer to further pass through the second polarizing layer. In a particular example, the inner polarizing film is coated with a transparent conductive coating on opposing sides such that the inner polarizing film is adjacent to a polymer dispersed liquid crystal or polymer network liquid crystal layer. An outer carrier film adjacent to the polymer dispersed liquid crystal or polymer network liquid crystal layer may be a non-polarizing carrier film. As such, a multifunctional switchable film having polarizing films may include a first non-polarizing carrier film with a transparent conductive coating, a polymer dispersed or polymer network liquid crystal layer, a polarizing film coated with transparent conductive coating on opposing sides, a liquid crystal layer, and a polarizing film coated with a transparent conductive coating facing the liquid crystal layer.

Figure 3:
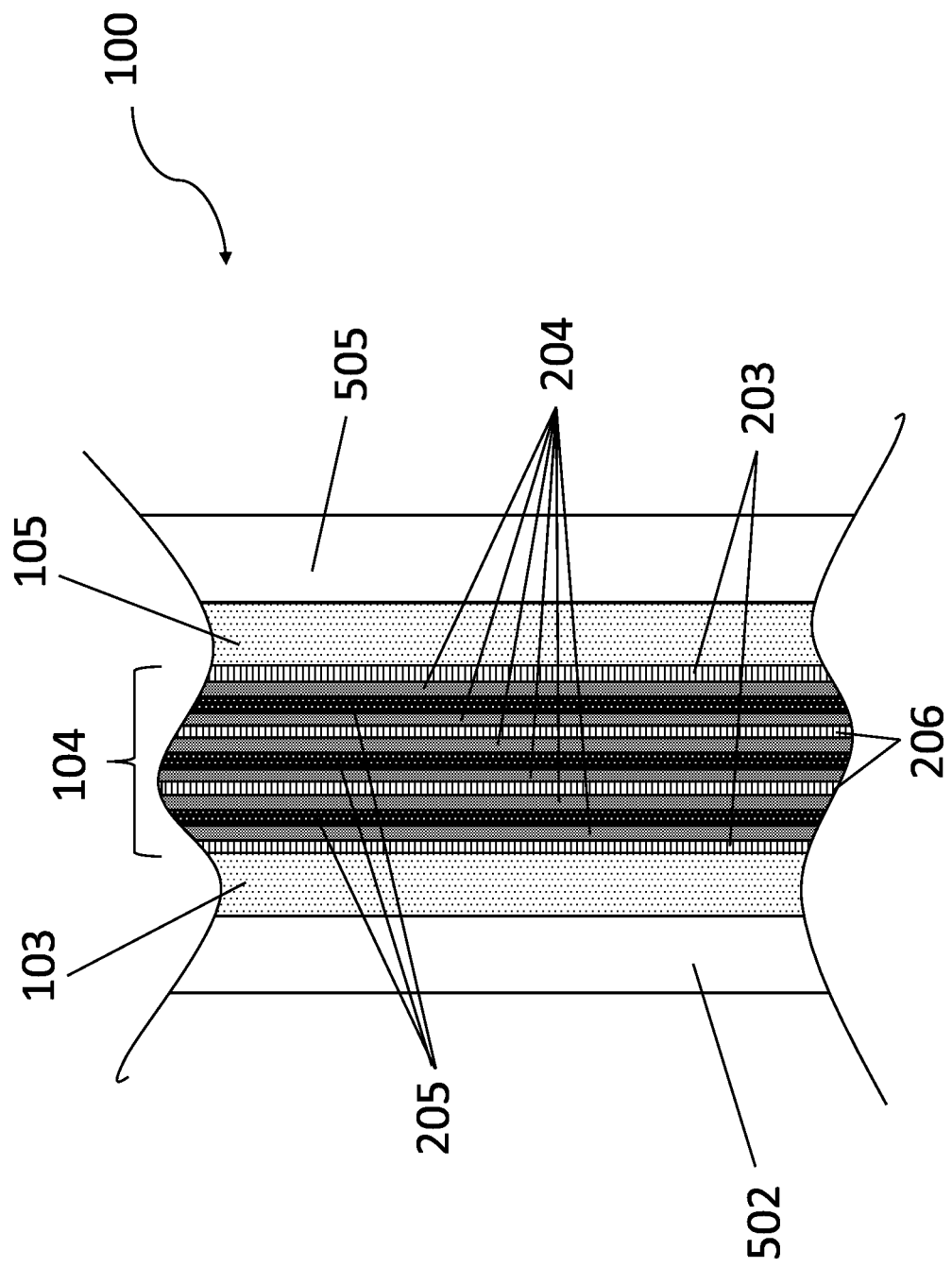
FIG. 3 illustrates a cross sectional view of a glass laminate including three switchable layers, according to an exemplary embodiment of the present disclosure.

As shown in FIG. 3, three switchable layers may be formed in a single laminate according to the present disclosure. The laminated glass substrates 502, 505 surround two polymer adhesive layers 103, 105, which surround a switchable film 104. The switchable film may include any number of switchable layers 205, which may be any suitable material. The switchable layers 205 in a switchable film 104 may be the same or different. In the switchable film 104 shown, two outer carrier films 203 face a polymer adhesive layer 103, 105 and are coated with a transparent conductive coating 204 on an opposing side, wherein the carrier film 203 side having the transparent conductive coating 204 faces a switchable layer 205. Between switchable layers 205 is a carrier film 206 coated with a transparent conductive coating 204 on opposing sides such that the transparent conductive coating 204 faces a switchable layer 205. The carrier films 203, 206 may include polymer films. A particular embodiment may include first, second, third, and fourth carrier films 203, 206 parallel to each other having transparent conductive coatings 204 on carrier film surfaces which face each other. In this embodiment, three switchable layers 205 may be provided between the carrier films 203, 206 and the transparent conductive coatings 204. For example, a liquid crystal layer which may be used as a display may be formed with a SPD layer on each side of the liquid crystal layer. When not in use, it may be desirable to include a SPD layer which may mask the milky color of an opaque liquid crystal layer. The SPD may then be switched to a transparent state when desired. Any combination of at least two switchable layers may be formed according to such embodiments.

The above description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Further, the above description in connection with the drawings describes examples and does not represent the only examples that may be implemented or that are within the scope of the claims.

Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

The invention claimed is:

1. A laminated glazing comprising:
 a first glass substrate and a second glass substrate laminated together having first and second polymer intermediate films therebetween; and
 a layered film laminated between the first and second polymer intermediate films, wherein the layered film comprises:
  at least three carrier films positioned in parallel to one another with a second carrier film positioned between first and third carrier films, wherein a first surface of the first carrier film is coated with a first transparent conductive coating and a first surface of the second carrier film is coated with a second transparent conductive coating, wherein the first surface of the first carrier film faces the first surface of the second carrier film, and
  wherein a second surface of the second carrier film is coated with a third transparent conductive coating and a first surface of the third carrier film is coated with a fourth transparent conductive coating, wherein the second surface of the second carrier film faces the first surface of the third carrier film;
  a first switchable layer positioned between the first and second carrier films; and
  a second switchable layer positioned between the second and third carrier films,
 wherein the first carrier film comprises a first polarizing film and the second carrier film comprises a second polarizing film, wherein the first polarizing film comprises a polarizing angle 90° to a polarizing angle of the second polarizing film,
 wherein the third carrier film comprises a non-polarizing carrier film, and
 wherein the first switchable layer comprises a liquid crystal layer.

2. The laminated glazing according to claim 1, wherein the glazing comprises an automotive glazing.

3. The laminated glazing according to claim 1, wherein the second switchable layer comprises a suspended particle device layer.

4. The laminated glazing according to claim 1, wherein the second switchable layer comprises a liquid crystal layer.

5. The laminated glazing according to claim 4, wherein at least one of the first switchable layer and the second switchable layer comprises a polymer dispersed liquid crystal layer.

6. The laminated glazing according to claim 1, wherein the second switchable layer comprises an electrochromic layer.

7. The laminated glazing according to claim 1, wherein the first switchable layer and the second switchable layer comprise different materials.

8. The laminated glazing according to claim 1, further comprising a first electrical connection for powering the first switchable layer and a second electrical connection for powering the second switchable layer, wherein the first electrical connection and the second electrical connection are controlled separately.

9. The laminated glazing according to claim 1, wherein the first and second transparent conductive coatings include deletions defining first segments of the first and second transparent conductive coatings.

10. The laminated glazing according to claim 1, wherein the layered film further comprises:
- a fourth carrier film facing the third carrier film, wherein a second surface of the third carrier film is coated with a fifth transparent conductive coating and a first surface of the fourth carrier film is coated with a sixth transparent conductive coating, wherein the second surface of the third carrier film faces the first surface of the fourth carrier film; and
- a third switchable layer positioned between the third and fourth carrier films.

11. The laminated glazing according to claim 1, further comprising an infrared reflective layer.

12. The laminated glazing according to claim 11, wherein the infrared reflective layer is at least one of the transparent conductive coatings.

13. The laminated glazing according to claim 1, further comprising a transparent dielectric layer.

14. The laminated glazing according to claim 1, wherein the second switchable layer is selected from the group consisting of a polymer dispersed liquid crystal layer and a polymer network liquid crystal layer.

15. The laminated glazing according to claim 1, wherein the laminated glazing is configured as a background for a display surface.

* * * * *